United States Patent
Tye

(10) Patent No.: US 7,287,792 B2
(45) Date of Patent: Oct. 30, 2007

(54) CROWN NECK CONTAINER GRIPPING DEVICE

(75) Inventor: David Tye, Huntington Beach, CA (US)

(73) Assignee: Aquatyzer Engineering, Inc., Signal Hill, CA (US)

( * ) Notice: Subject to any disclaimer, the term of this patent is extended or adjusted under 35 U.S.C. 154(b) by 0 days.

(21) Appl. No.: 10/678,901

(22) Filed: Oct. 2, 2003

(65) Prior Publication Data

US 2004/0245791 A1 Dec. 9, 2004

Related U.S. Application Data

(60) Provisional application No. 60/416,045, filed on Oct. 3, 2002.

(51) Int. Cl.
*B66C 1/42* (2006.01)

(52) U.S. Cl. .................................. 294/103.1; 294/99.1

(58) Field of Classification Search ..............................
198/867.05–867.08, 470.1; 29/245; 215/304;
81/3.4, 3.36, 3.42; 294/87.26, 103.1, 34,
294/104

See application file for complete search history.

(56) References Cited

U.S. PATENT DOCUMENTS

| | | | | |
|---|---|---|---|---|
| 1,439,302 A | * | 12/1922 | Erickson | 248/217.1 |
| 1,728,418 A | * | 9/1929 | Litchfield | 81/3.36 |
| 1,741,607 A | * | 12/1929 | Bradley | 81/3.36 |
| 1,783,939 A | * | 12/1930 | Schroder | 414/739 |
| 1,832,409 A | * | 11/1931 | Mueller | 294/168 |
| 1,886,473 A | * | 11/1932 | Dries | 294/34 |
| 1,964,392 A | * | 6/1934 | Thomas | 294/34 |
| 2,323,080 A | * | 6/1943 | Anderson | 81/3.57 |
| 3,069,035 A | * | 12/1962 | Schwarz et al. | 414/416.05 |
| 3,604,742 A | * | 9/1971 | Sprague | 294/33 |
| 4,681,213 A | * | 7/1987 | Winiasz | 198/803.9 |
| 5,094,340 A | * | 3/1992 | Avakov | 198/626.1 |
| 5,301,857 A | | 4/1994 | Green | |
| 5,743,377 A | * | 4/1998 | Kronseder | 198/803.9 |

FOREIGN PATENT DOCUMENTS

| | | |
|---|---|---|
| DE | 40 11 499 A1 | 10/1991 |
| EP | 1 277 693 A1 | 1/2003 |
| EP | 1 281 661 A1 | 2/2003 |
| GB | 302043 | 12/1928 |

* cited by examiner

*Primary Examiner*—Saul Rodriguez
*Assistant Examiner*—Esther O Okezie
(74) *Attorney, Agent, or Firm*—Hani Sayed; Rutan & Tucker, LLP

(57) ABSTRACT

The present invention is directed toward a bottle gripping device that grips a bottle at discrete points comprising a minimal area of the bottle. More specifically, the gripping device typically contacts the bottle at four discrete points and such total area of contact is preferred to be less than 25% of the total circumference of the bottle neck.

6 Claims, 2 Drawing Sheets

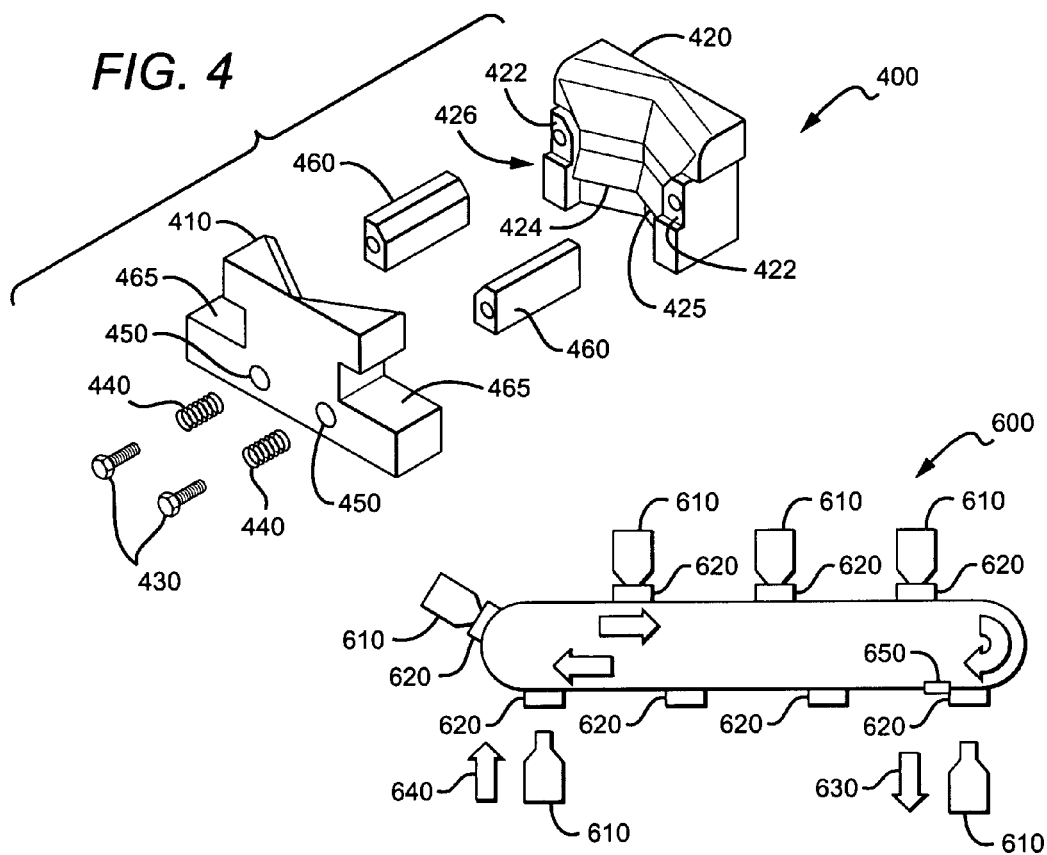
FIG. 4
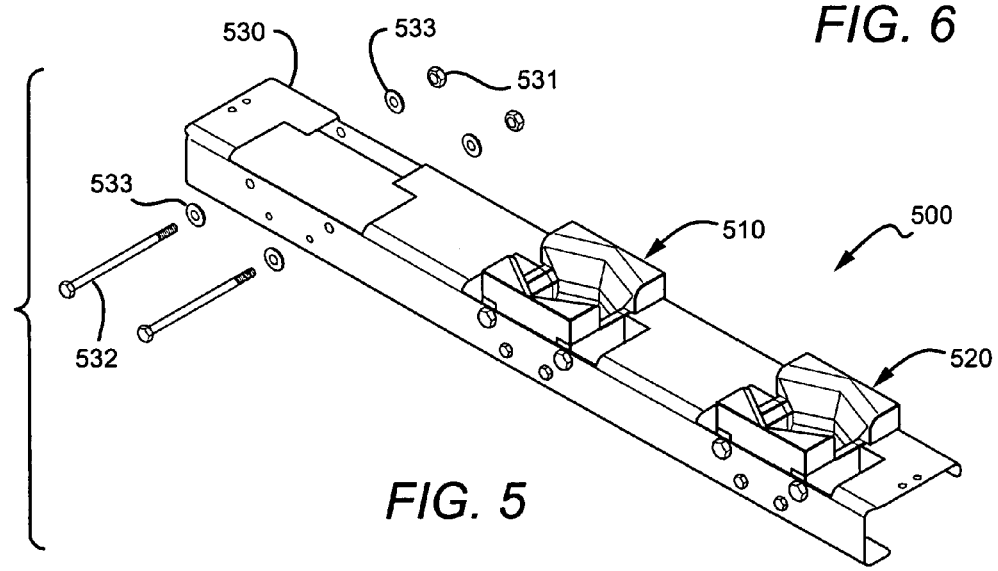
FIG. 6
FIG. 5

CROWN NECK CONTAINER GRIPPING DEVICE

This application claims the benefit of U.S. provisional application No. 60/416,045 filed on Oct. 3, 2002 incorporated herein by reference in its entirety.

FIELD OF THE INVENTION

The field of the invention is gripping devices.

BACKGROUND OF THE INVENTION

Polycarbonate containers (used interchangeably herein with "bottle(s)") are used to store water and other liquids. Such containers are typically 3 and 5 gallons and have a crown neck. A crown neck has an annular lip near the top of the bottle. Below the lip, the contour of the bottle forms a curved indentation that provides stability when used with certain gripping devices. Most gripping devices approximate the shape of the curved indentation in order to more securely grip the bottle. A problem with such devices, however, is that they contact a substantial area of the neck thereby limiting the cleaning and sanitization of the bottle in those areas.

There is a need for methods and devices directed toward securely gripping a bottle without contacting a substantial area of the bottle's neck.

SUMMARY OF THE INVENTION

The present invention provides a bottle gripping device that grips a bottle during a cleaning, capping, or filling process. The gripping device contacts the bottle at discrete points comprising a minimal area of the bottle. More specifically, the gripping device typically contacts the bottle at four discrete points and such total area of contact is preferred to be less than 25% of the total circumference of the bottle neck. In certain embodiments, a gripping device has two gripping members—one stationary and one that moves. The gripping member that moves (the biased member) is typically biased toward the stationary gripping member by a spring. The contour of the gripping members is tapered such that when a bottle is pushed between the gripping members, the biased member is forced away from the stationary member. The bottle neck has a lip and a recess that cooperate with the contour of the gripping members to hold the bottle.

Methods of cleaning, filling, or capping a bottle generally include the steps of: providing a bottle having a neck with a circular cross section; and gripping the bottle by contacting the neck at four discrete points along the circumference of the neck.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 4 is an exploded view of a gripping device.

FIG. 5 is a perspective view of a gripping assembly.

FIG. 6 is a schematic of a bottle cleaning process.

DETAILED DESCRIPTION

Figure 1:
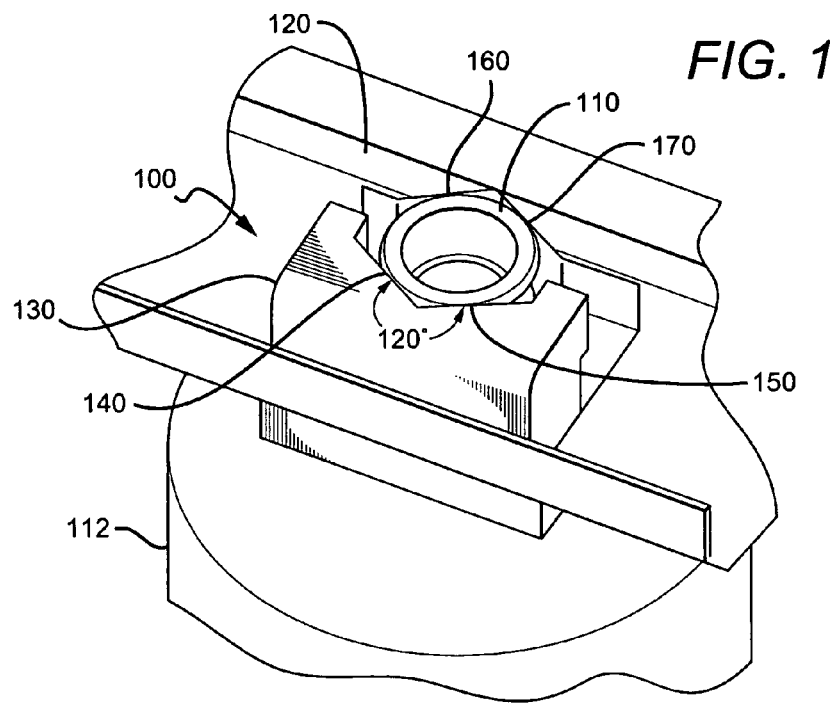
FIG. 1 is a perspective view of a gripping device in a gripped configuration.

Referring first to FIG. 1, a bottle gripping system 100 generally comprises a stationary gripping member 130, a biased gripping member 120, and a bottle 112.

It should be noted that in the gripped configuration depicted by FIG. 1, the stationary gripping member 130 contacts the bottle at two discrete points identified by numerals 140 and 150. Likewise, biased gripping member 120 contacts the bottle at two points—those identified by numerals 160 and 170.

As defined herein a discrete point is an area of contact formed by a relatively straight line and an object having a relatively circular cross section. Because the bottle is not truly circular in cross section (i.e. there is a degree of error or variance) and the lines of the gripping members are not truly straight, a discrete point can be up to 25% of the total circumference of the bottle at the area where the gripping members contact the bottle (typically at the neck). In more preferred embodiments, even less area of contact is achieved. In fact, the points of contact may comprise as little as 10° of arc out of a total of 360° (i.e. only about 3% of the total circumference assuming a 360° circumference). Because the area of contact is generally not shielded from the cleaning process, it is desirable to have a gripping device that contacts a bottle over as little area as possible.

While a "bottle" is referred to throughout, it should be recognized that other types of containers can be substituted for a bottle so long as they have the required properties required to force open the gripping members and to be held by the gripping members. A preferred container is a five gallon polycarbonate bottle that typically stores water. Of course, the container may be made of other appropriate materials including glass and other substantially rigid thermoplastics that can withstand a high temperature cleaning cycle (e.g. 180° F.).

A bottle 112 has a bottle opening defined by lip 110. It is the lip portion of the bottle that rests above a groove in the contour of at least one of the gripping members. While a lip 110 generally is annular and has a circular cross section, this is not a requirement for a container; other appropriate containers may have a lip that is not substantially annular.

Figure 2:
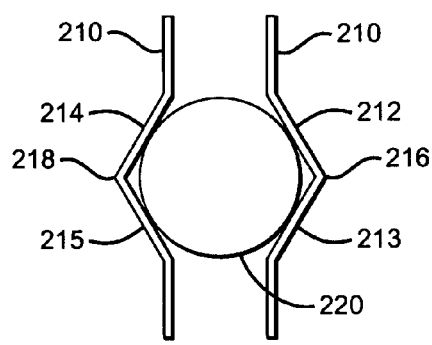
FIG. 2 is a top down view of a gripping device gripping and a bottle opening.

Drawing your attention to FIG. 2, a gripping device 210 is preferred to have four substantially straight sides 212-215. In a gripped or closed configuration, the bottle lip 220 is located above a ridge (not shown in this figure) of a gripping member with the ridge generally being positioned adjacent to a recess in the crown neck of the bottle. Sides 212 and 213 come together at a point 216 and form an angle of approximately 120°. Similarly, opposing sides 214 and 215 form an approximate 120° angle at point 218.

Figure 3:
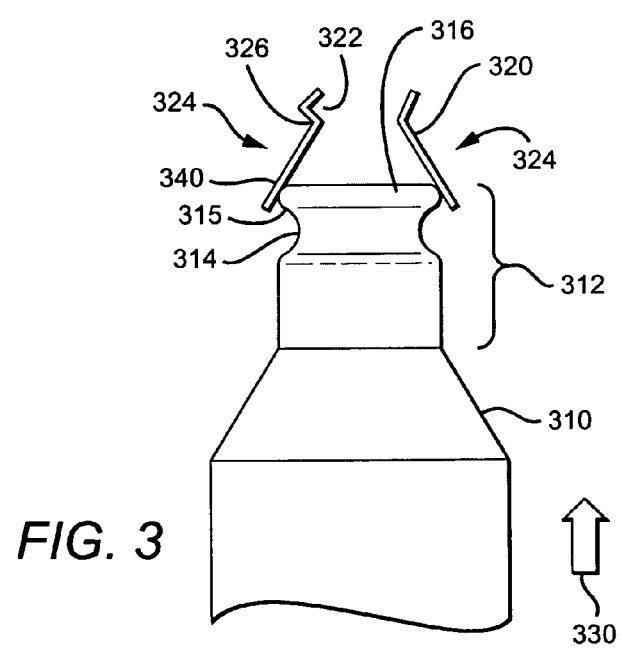
FIG. 3 is a side view of a bottle and a gripping device contour.

A bottle 310 as depicted in FIG. 3 generally has a "crown neck" which is identified by numeral 312. A lip 316 forms a shoulder 315 that contours into a recess 314. As the bottle 310 is pushed upward as identified by arrow 330, the lip 316 forces the gripping members 320 and 340 apart. In a preferred embodiment only one of the gripping members is biased (e.g. by spring or other tension producing component) and the biased gripping member will move away from the other gripping member (the stationary or fixed member) which remains in its place. In a less preferred embodiment, both gripping members could be biased and therefore both could move apart simultaneously. The bottle 310 continues upward until the lip 316 reaches area 322. With the lip 316 resting in area 322, discrete point 326 contacts the bottle 310 at annular recess 314.

FIG. 4 is an exploded view of an unmounted gripping device 400. It can be observed that biased gripping member 410 is mounted using bolts 430 which extend from a body (shown in FIG. 5). Springs 440 are placed over bolts 430 and fit into apertures 450 which are sized and dimensioned to be slightly large than the diameter of the spring that fits within it. Surfaces 465 of the biased gripping member 410 slide along guide rails 460 as the biased gripping member 410 moves between gripped and released configurations. The guide rails abut surfaces 422 of the stationary gripping member 420. With respect to the contour of stationary gripping member 420, a portion of ridges 424 and 425 are envisaged to contact the bottle, each at a discrete point. The inner surface 426 of gripping member 420 is generally tapered, however it should be recognized that varying degrees of taper may be appropriate including some portions which are not tapered at all and some which are inversely tapered. The only requirement with respect to the inner surface of a gripping member is that it be adapted to accept the bottle and to grip the crown neck at a discrete point. In some embodiments, it may be appropriate to have only a single gripping member having a tapered inner surface and associated ridges.

Gripping members 410 and 420 are generally constructed of an abrasion resistant and durable material such as a UMHW (ultra high molecular weight) polyethylene. Other materials may be used instead of or in addition to the UMHW polyethylene; an especially contemplated material is polytetrafluoroethylene (e.g. Teflon™). It is important to note that the material(s) used for the gripping device are preferred to withstand relatively high temperatures (e.g. 180° F.) because during a wash and/or sanitize cycle, the gripping devices may be subjected to such temperatures. Another characteristic of a preferred gripping device material is that it be an approved "food grade" material as determined by the FDA. Among other things, the material should be relatively non-percutaneous to the chemicals that are used to wash and sanitize bottles.

FIG. 5 shows a gripping assembly 500 which comprises a plurality of gripping devices 510 and 520. The gripping devices are mounted to a body 530 by nuts 531, bolts 532, and washers 533. The bolts 532 protrude the body 530 as well as portions of the gripping devices 510 and 520. The body, springs, nuts, bolts, and washers are preferred to be constructed of stainless steel. However, other acceptable materials may be substituted so long as they meet the requirements outlined above with respect to the gripping members.

FIG. 6 shows a cleaning system 600 for bottles. The cleaning system includes a plurality of gripping devices 620 mounted on a body which revolves through various steps of the washing process. A similar configuration could be used to fill and cap bottles.

Bottles 610 which are gripped by the gripping devices 620 are in position to be moved through the steps of the washing process. After having gone through those steps, the bottles are dropped from the gripping device as indicated by arrow 630. In a preferred class of embodiments, bottles 610 are released from grip by the gripping devices 620 as a result of pneumatic fingers 650 which automatically move the biased gripping member away from the stationary gripping member thereby releasing the bottle. Automatic release of a bottle may further involve the use of a sensor, an electronic signal receiver, and a microprocessor programmed to release bottles meeting only certain criteria. A bottle may alternatively be removed manually however manual removal is less favored.

Methods of cleaning, filling, and capping include the step of providing a bottle having a neck with a circular cross section. This type of neck is typically known as a crown neck and is exemplified by numeral 312 in FIG. 3. A further step in a preferred method includes gripping the bottle by contacting the neck at four discrete points along the circumference of the neck. In other embodiments, less or more than four points may be used to grip a bottle, however, each of those points should be discrete as defined herein. In the process of gripping a bottle, the bottle lip is used to apply pressure to the gripping members in order to force the gripping members apart.

An additional step is releasing the bottle. Release of a bottle may be accomplished with pneumatic fingers or though use of other components and such release may be manual or automatic. A prior step to releasing of a bottle may be inspecting of the bottle. Inspection is likely to further comprise manually observing (e.g. by a human eye) or automatically observing (e.g. by a sensor). Bottles that do not meet certain predefined specifications for cleanliness, sanitization, microorganism count, and so on . . . may repeat the process without being released.

Thus, specific embodiments and applications of a gripping device have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A bottle gripping device for gripping a crown neck of a bottle during cleaning, capping, and filling, comprising:
   a first stationary gripping member;
   a support body coupled to the first stationary gripping member;
   a first biased gripping member that is biased toward the first stationary gripping member by at least one spring and is adapted to move away from the first stationary gripping member as a result of pressure from the bottle;
   an opening formed between the first biased gripping member and the first stationary gripping member capable of receiving a crown neck of the bottle to apply the pressure;
   a second stationary gripping member coupled to the support body;
   a second biased gripping member coupled to the support body wherein the second biased gripping member is biased toward the second stationary gripping member;
   a movable pneumatic finger which automatically moves the biased gripping member away from the stationary gripping member thereby releasing the bottle; and
   wherein the device is adapted to contact the bottle at a plurality of distinct points comprising a total of less than 25% of a total circumference of the crown neck.

2. The device of claim 1, wherein the bottle has a 360° circumference and the distinct points comprise less than 90° of arc.

3. The device of claim 1, further comprising a guide upon which the first biased gripping member slides between a gripped configuration and a released configuration.

4. The device of claim 3, wherein the first stationary gripping member has a groove that cooperates with the crown neck to hold the bottle.

5. A method of cleaning, filling, or capping a bottle, comprising:
   providing a bottle having a neck with a circular cross section;
   providing a support frame coupled to a biased gripping member and a stationary gripping member;
   wherein the biased gripping member is biased toward the stationary gripping member and forms an opening between the stationary gripping member and the biased gripping member;
   pushing the bottle through the opening such that the neck of the bottle pushes the biased gripping member away from the stationary gripping member;
   gripping the bottle at a plurality of discrete points along the circumference of the neck;
   performing at least one of cleaning, filling, and capping of the bottle; and
   releasing the bottle from the gripping members by providing a movable pneumatic finger which automatically moves the biased gripping member away from the stationary gripping member thereby releasing the bottle.

6. The method of claim 5, wherein the step of gripping the bottle further comprises using the bottle to apply pressure to the biased gripping member.

* * * * *